(12) United States Patent
Sung et al.

(10) Patent No.: US 8,213,728 B2
(45) Date of Patent: Jul. 3, 2012

(54) METHOD AND APPARATUS OF IMAGE COMPRESSION WITH OUTPUT CONTROL

(75) Inventors: Chih-Ta Star Sung, Glonn (DE); Yin-Chun Blue Lan, Wurih Township, Taichung County (TW)

(73) Assignee: Taiwan Imagingtek Corporation, Juhdong (TW)

( * ) Notice: Subject to any disclaimer, the term of this patent is extended or adjusted under 35 U.S.C. 154(b) by 1052 days.

(21) Appl. No.: 12/157,981

(22) Filed: Jun. 16, 2008

(65) Prior Publication Data
US 2009/0310857 A1 Dec. 17, 2009

(51) Int. Cl.
*G06K 9/36* (2006.01)
(52) U.S. Cl. ........................ 382/232; 382/166
(58) Field of Classification Search .......... 382/232–251, 382/173, 162, 166; 375/240.01–240.29; 358/1.9, 1.2, 539; 345/589–604, 560, 629; 348/390.1–425.1, 441, 231.99; 370/412
See application file for complete search history.

(56) References Cited

U.S. PATENT DOCUMENTS

| 7,545,438 | B2* | 6/2009 | MacInnis et al. | 348/441 |
| 7,667,710 | B2* | 2/2010 | MacInnis et al. | 345/560 |
| 7,885,472 | B2* | 2/2011 | Yamamoto | 382/232 |
| 2009/0238198 | A1* | 9/2009 | Niu et al. | 370/412 |
| 2009/0290045 | A1* | 11/2009 | Fukuda et al. | 348/231.99 |
| 2010/0008571 | A1* | 1/2010 | Lan et al. | 382/166 |

* cited by examiner

*Primary Examiner* — Ishrat I Sherali

(57) ABSTRACT

A method of compressing an image by saving the compressed color components into multiple temporary buffers with each time slot saving the color component to the different buffer. A method deciding when to shift the compressed color components to another device is applied to avoid underflow and overflow of the output buffer.

20 Claims, 5 Drawing Sheets

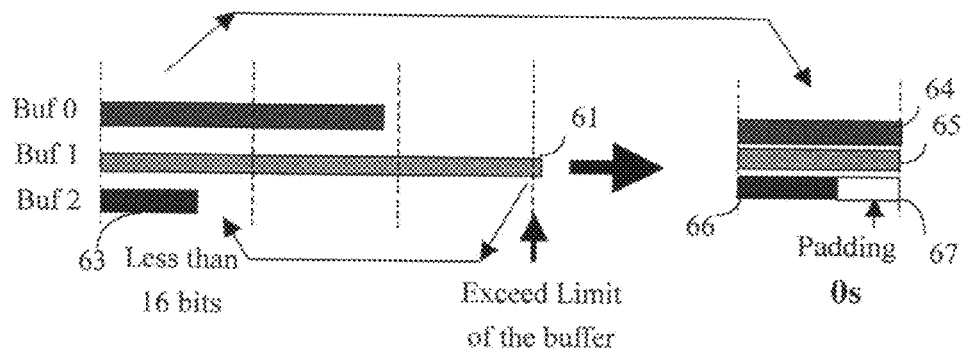
Fig. 6 Handling Buffer exceeds the limit
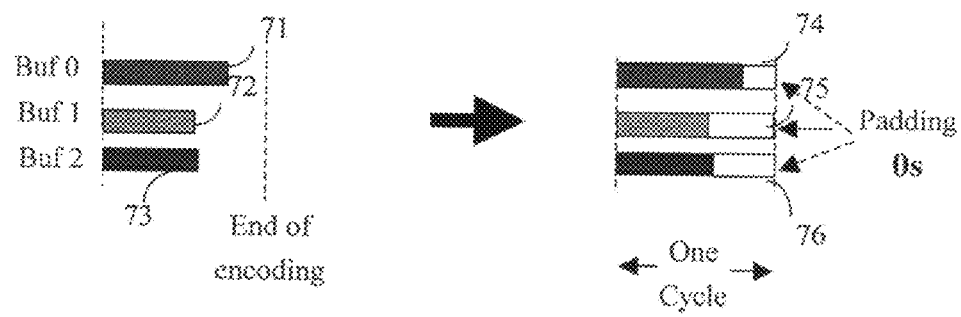
Fig. 7
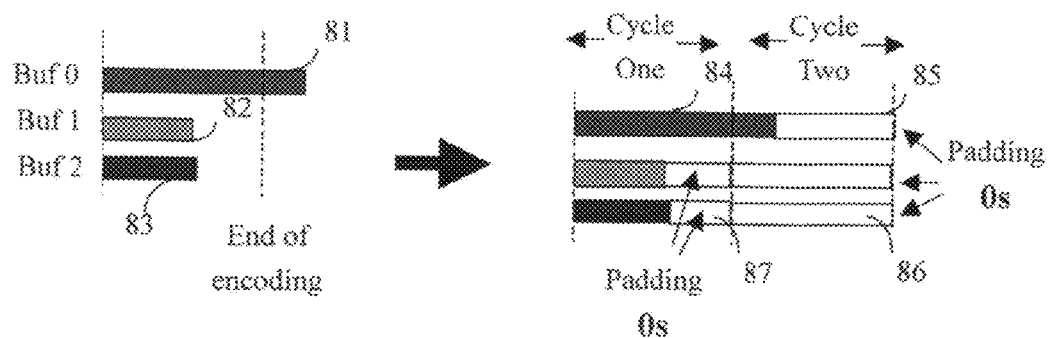
Fig. 8

METHOD AND APPARATUS OF IMAGE COMPRESSION WITH OUTPUT CONTROL

BACKGROUND OF THE INVENTION

1. Field of Invention

The present invention relates to method of image compression, and particularly relates to image compression method by applying an intelligent output buffer input and output control.

2. Description of Related Art

Compression has key benefits in cost reduction of storage device and speedup in accessing the compressed data. Most popular still image compression standards including JPEG, JPEG2000 are lossy algorithms which cause data difference by quite high degree of difference between the compressed-decompressed image and the original image during the procedure of image compression. The data loss caused by lossy compression algorithm degrades the image quality which might not be acceptable in some applications.

There are very few lossless image compression algorithms of image data reduction. One of the most commonly adopted approach is taking differential value between adjacent pixels and applying the so called "entropy coding" or "Variable Length Coding" method which uses the shortest code to represent the most frequent happened pattern.

Lossy compression algorithms can achieve higher compression rate, for example, the JPEG has between 10 to 20 times compression ratio, at the cost of sacrificing the image quality and large amount of computing power and temporary storage buffer. Sharp image quality can be achieved by the lossless compression algorithm but the compression rate is most likely lower than that of the popular lossy algorithms like JPEG or JPEG2000.

The method of this invention of image data compression is to achieve a reasonable high compression ratio with simple means of realizing in both hardware and software without sacrificing much the image quality compared to prior art lossless compression algorithms.

SUMMARY OF THE INVENTION

In prior art image compression methods, sometimes, one of the three components is very complex which make difficulty in storing with limited buffer density. In some region of an image, one or two color component has simple pattern and after compression, the compressed data amount is too few and can make the output buffer empty and no data to be sent out. The present invention is related to a method of the image compression with intelligent output control by rotating before storing the compressed multiple color components into the temporary image buffer. The present invention significantly increases image quality and reducing the required density of the storage device compared to other counter part high quality compression methods.

The present invention of the image compression compresses multiple color components separately and packing them into a temporary buffer in a predetermined frequency with rating the order of color components which can minimize the need of larger density of the temporary buffer.

The present invention of the image compression sends the buffered compressed image to another storage device only when all color components reach a predetermined threshold amount of bits.

According to one embodiment of the present invention, a buffer used to store the compressed pixels will be filled to a predetermined level before starts output the compressed pixels data.

According to another embodiment of the present invention, a water marker is applied to monitor the level of fullness of the output buffer.

According to an embodiment of this invention, when the level of the output buffer is in between two predetermined levels, a corresponding compression ratio will be enforced to compress the image.

According to another embodiment of the present invention, when the compression cycle is completed, if the temporary buffer has more than a predetermined amount of bits, additional clock cycle (or cycles) will be enforced to allow the compressed data to be flushed out.

According to another embodiment of the present invention, when outputting the non-full temporary buffer, the empty registers will be filled by a predetermined polar of "0"s or "1"s.

It is to be understood that both the foregoing general description and the following detailed description are by examples, and are intended to provide further explanation of the invention as claimed.

BRIEF DESCRIPTION OF THE DRAWINGS

FIG. 6 illustrates the mechanism of handling the situation of buffer exceeding the limit.

FIG. 7 illustrates the mechanism of handling a normal case of the end of encoding which needs filling some dummy code like "0s".

FIG. 8 illustrates the mechanism of handling a case of the end of encoding with one of the three color components needing to filling dummy code like "0s" in different time slot.

DESCRIPTION OF THE PREFERRED EMBODIMENTS

Due to sharp quality and good immunity to the noise, and convenience in storage, the digital image has prevailingly become popular in mass applications like digital camera, digital camcorder, digital photo albums, scanner/printer/fax, image archiving and storage . . . etc.

ITU and ISO have developed and defined some image and video compression algorithms including JPEG, a still image compression standard and MPEG, the video compression standard. The JPEG image has widely applications with the cost of data loss compared to the original image.

Figure 1A:
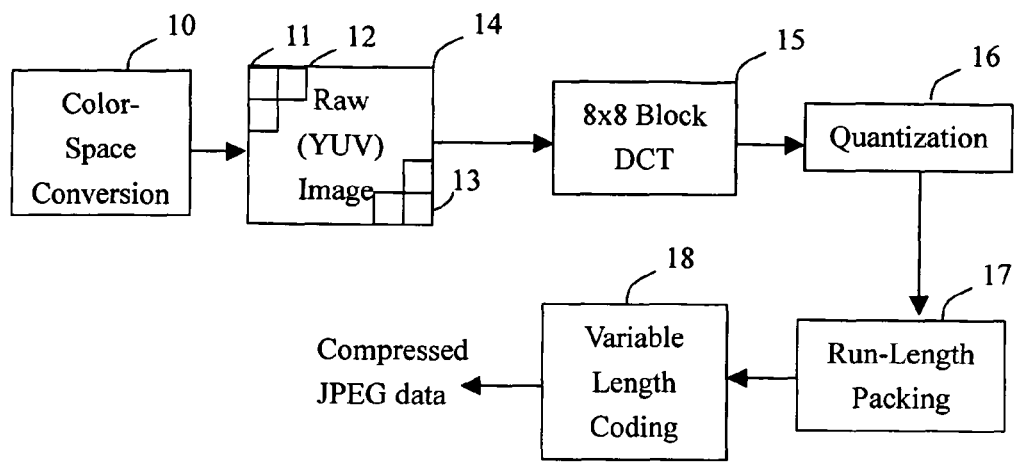
FIG. 1A depicts a prior art, he JPEG still image compression procedure which is a lossy algorithm.

JPEG image compression as shown in FIG. 1A, a prior art of still image compression algorithm, includes some procedures in compression. The color space conversion 10 is to separate the luminance (brightness) from chrominance (color) and to take advantage of human being's vision less sensitive to chrominance than to luminance and the can reduce more chrominance element without being noticed. An image 14 is partitioned into many units of so named "Block" of 8×8 pixels to run the JPEG compression.

A color space conversion 10 mechanism transfers each 8×8 block pixels of the R (Red), G (Green), B (Blue) components into Y (Luminance), U (Chrominance), V (Chrominance) and further shifts them to Y, Cb and Cr. JPEG compresses 8×8 block of Y, Cb, Cr 11, 12, 13 by the following procedures:

Step 1: Discrete Cosine Transform (DCT)
Step 2: Quantization
Step 3: Zig-Zag scanning
Step 4: Run-Length pair packing and
Step 5: Variable length coding (VLC).

DCT 15 converts the time domain pixel values into frequency domain. After transform, the DCT "Coefficients" with a total of 64 sub-bands of frequency represent the block image data, no long represent single pixel. The 8×8 DCT coefficients form the 2-dimension array with lower frequency accumulated in the left top corner, the farer away from the left top, the higher frequency will be. Further on, the closer to the left top, the more DC frequency which dominates the more information. The more right bottom coefficient represents the higher frequency which less important in dominance of the information. Like filtering, quantization 16 of the DCT coefficient is to divide the 8×8 DCT coefficients and to round to predetermined values. Most commonly used quantization table will have larger steps for right bottom DCT coefficients and smaller steps for coefficients in more left top corner. Quantization is the only step in JPEG compression causing data loss. The larger the quantization step, the higher the compression and the more distortion the image will be.

After quantization, most DCT coefficient in the right bottom direction will be rounded to "0s" and only a few in the left top corner are still left non-zero which allows another step of said "Zig-Zag" scanning and Run-Length packing 17 which starts left top DC coefficient and following the zig-zag direction of scanning higher frequency coefficients. The Run-Length pair means the number of "Runs of continuous 0s", and value of the following non-zero coefficient.

The Run-Length pair is sent to the so called "Variable Length Coding" 18 (VLC) which is an entropy coding method. The entropy coding is a statistical coding which uses shorter bits to represent more frequent happen patter and longer code to represent the less frequent happened pattern. The JPEG standard accepts "Huffman" coding algorithm as the entropy coding. VLC is a step of lossless compression procedure.

Figure 1B:
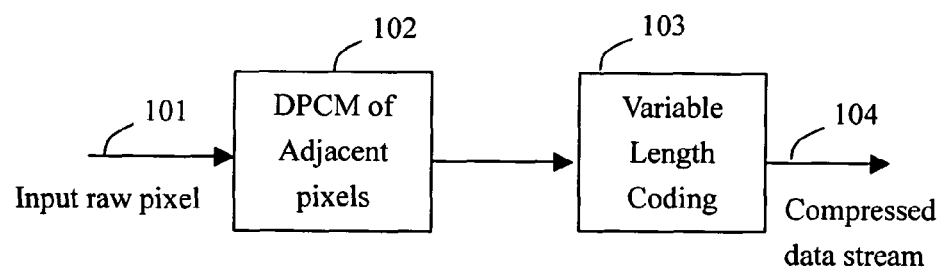
FIG. 1B depicts another prior art of image compression: DPCM and a VLC coding.

A well known prior art of the lossless image compression method is shown in FIG. 1B which calculates the differential value 102 of the input adjacent pixels 101 and runs the variable length coding 103, the VLC coding. A VLC coding uses the shortest code to represent the most frequent happen pattern, and longer code to represent the less frequent happen pattern. Though having simplicity in realization, the disadvantage of the prior art in FIG. 1B is that it can not reach higher compression rate.

JPEG is a lossy compression algorithm, the JPEG picture with less than 5× compression rate has sharp image quality, 10× compression will have more or less noticeable quality degradation.

The JPEG compression procedures are reversible, which means the following the backward procedures, one can decompresses and recovers the JPEG image back to raw and uncompressed YUV (or further on RGB) pixels. The main disadvantage of JPEG compression algorithm is the input data are sub-sampled and the compression algorithm itself is a lossy algorithm caused by quantization step which might not be acceptable in some applications.

Very few lossless image compression algorithms have been developed due to the following two factors:

The standard JPEG Image with 10× compression rate has still acceptable good image quality in most applications.

It is tough to achieve high compression rate of the lossless compression.

This invention of the image compression overcomes the disadvantages of both lossy compression algorithm like JPEG and another prior art of VLC coding of the differential values of adjacent pixel in quality and compression rate issues.

Figure 2:
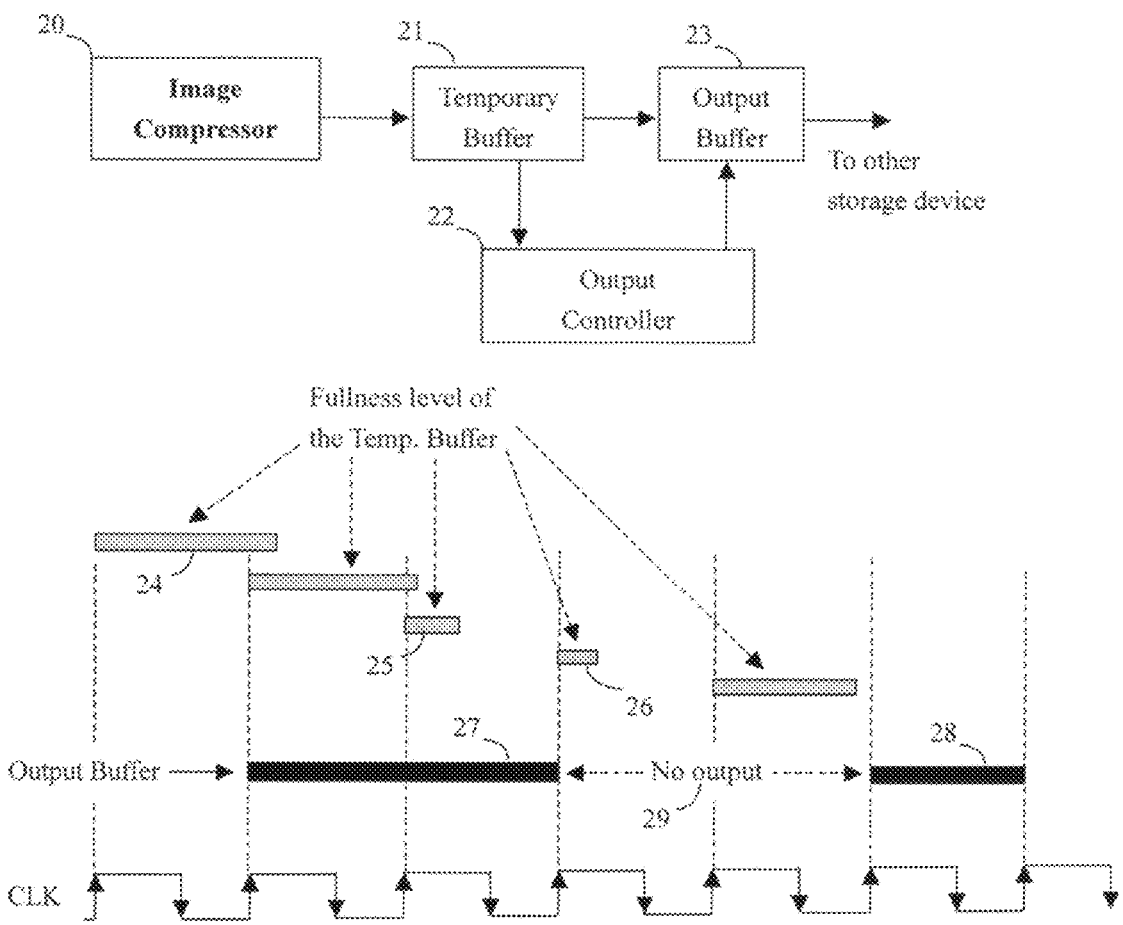
FIG. 2 depicts a prior art image compression with output control and the related data output waveforms.

Most prior art compression methods 20, as shown in FIG. 2 calculate the difference of adjacent pixels for most pixels and applying a VLC coding method. The prior art method is applying an buffer control 22 to decide when and how to send the compressed pixels which is temporarily stored in a buffer 21 into another output buffer 23. One of the drawbacks of this kind of prior art image compression is inconsistency of compression ratio of each group of pixels which results in variable data rate of the compressed group of pixels. Some groups of pixels having complex patterns result in more bit rate to represent them causing more full level 24 of the temporary buffer. While some groups of pixels having simple patterns result in less bit rate and causing lower level 25, 26 of the temporary buffer. Most image display system have one pixel comprising three color components, Red, Green and Blue, or Y, U, V. Sometimes, one of the three components is very complex which make difficulty in storing with limited buffer density. In some region of an image, one or two color component has simple pattern and after compression, the compressed data amount is too few and can make the output buffer empty and no data to be sent out. In some clock cycles 27, 28 will there compressed pixels to be output and some cycle time 29 might not enough compressed pixels data to be sent out due to the emptiness of the output buffer resulted from continuous simple groups of pixels. This kind of prior art image compression requires complex memory interface control and system design.

Figure 3:
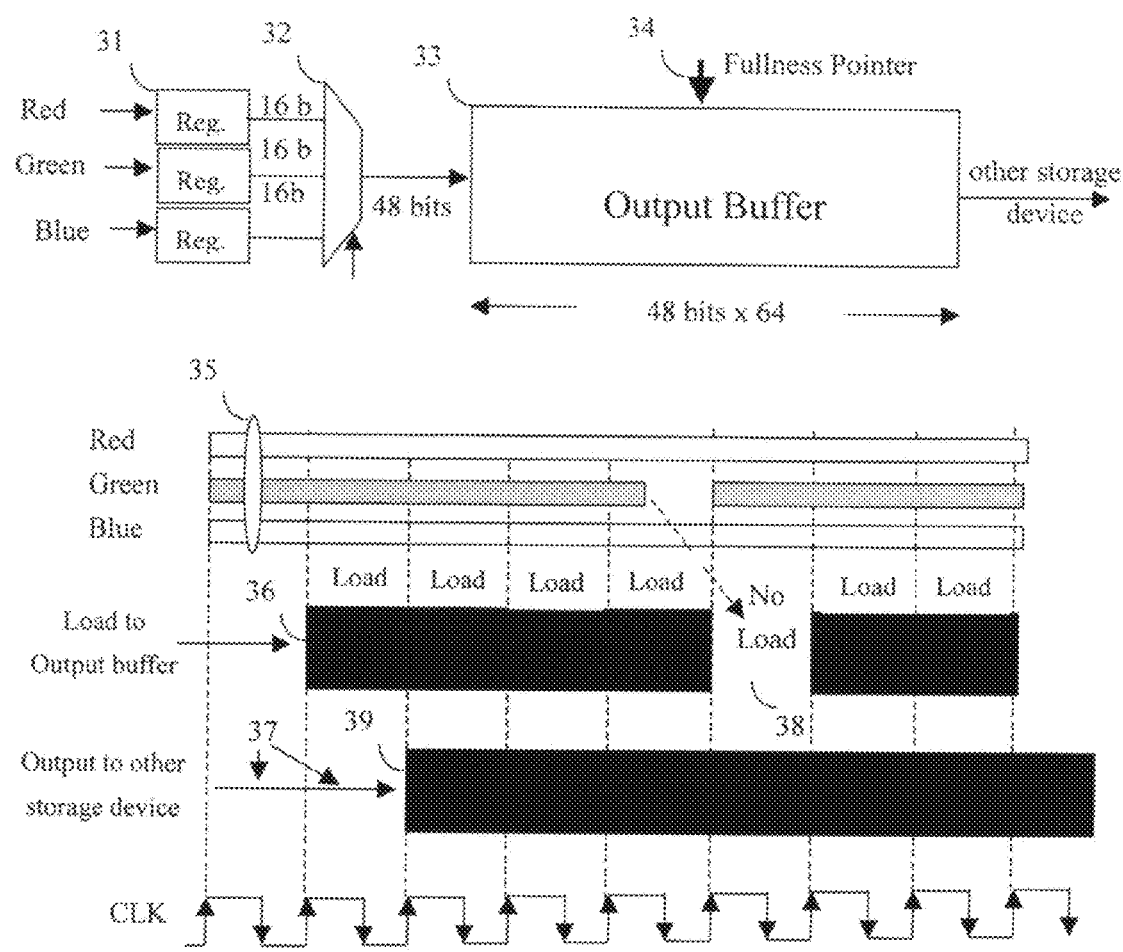
FIG. 3 depicts the conceptual diagram of this invention of image compression with output buffer with a mechanism avoiding the underflow or overflow.

FIG. 3 depicts this invention of image compression with an intelligent output buffer control mechanism which overcomes the drawback of prior art of image compression as described in above paragraph. The registers 31 temporarily saving the compressed 3 color components with rotated order of storing the Red, Green, Blue 3 color components, or Y, U and V components. Which means, in each fixed time frame, the 3 registers will store R,G,B in T1 time slot, and G,B,R in T2 time slot, B,R,G in T3 time slot, and R,G,B again in T4 time slot . . . . The output of the 3 registers will be shifted 32 to another bigger output buffer 33 only when all 3 registers reach the same predetermined depth of data, for example, 16 bits. To ensure the constant data output rate, the output buffer will not send the compressed pixels out till it reaches the predetermined level of fullness with a pointer 34 tracking the fullness of the output buffer.

In each predetermined time slot, the 3 registers' controller will check the level of the 3 registers, if all of the 3 registers reach the predetermined level 35, the compressed color components will be loaded 36 to the output buffer. If one of the 3 color component has too simple pattern resulting in not enough compressed data and in that corresponding time slot, the compressed pixel in the 3 registers will NOT be loaded 38 to the output buffer. This invention of rotating the compressed color components successfully reduces the probability of having one of them getting insufficient compressed data to let compressed data within the 3 registers to be loaded to the output buffer. And the output buffer has a pointer 34 to monitor the fullness level of the output buffer and decides the time to send the compressed pixel out 37. The first compressed data will not be sent out to other device 39 like an external memory until the output buffer reaches the predetermined level. This kind of mechanism controlling the output data successfully avoid overflow and underflow of the output buffer with minimized density of the output buffer.

Figure 4:
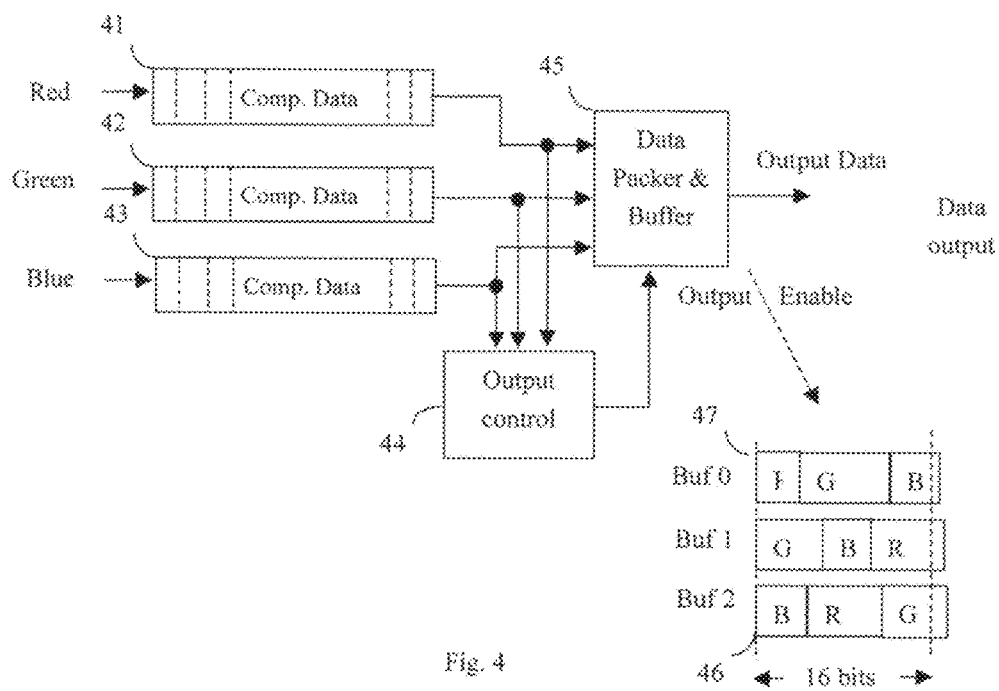
FIG. 4 depicts this invention of the image compression with well controlled rotating the compressed color components into the output buffer to minimize the required buffer size to avoid underflow and overflow.
Figure 5:
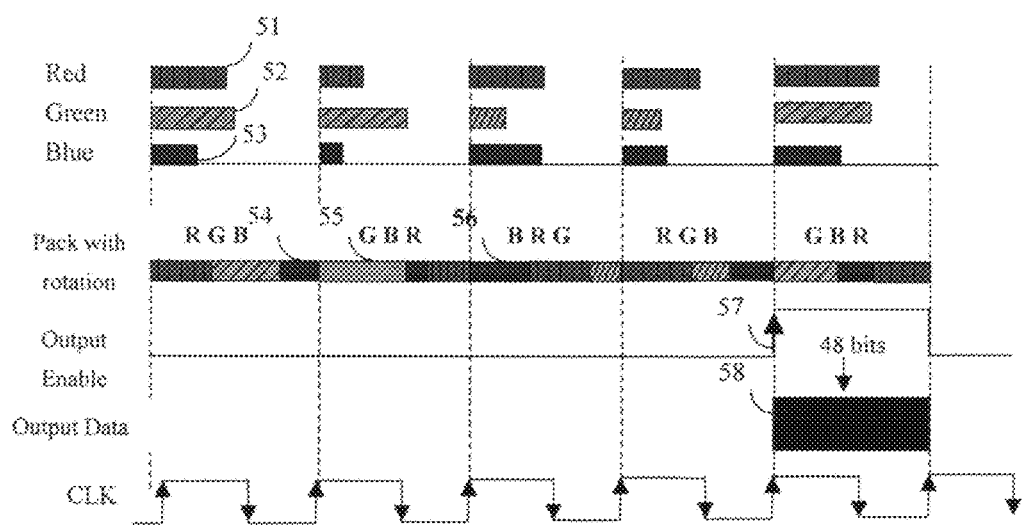
FIG. 5 illustrates this invention of packing the compressed color components with rotation.

A more detail explanation of this invention is shown in FIG. 4 which include a temporary buffer saving the compressed 3 color components 41, 42, 43 (R,G,B or Y,U,V) and will be loaded to the output buffer 45 with each rotated order in different time slot. The compressed pixel data within the output buffer will not be sent out till a predetermined level 47, for example, 16 bits is reached. An intelligent buffer controller 44 is used to calculate the fullness of the output buffer and decides when the compressed pixel data can be shifted out to other device. FIG. 5 illustrates the conceptual diagram of the output buffer control. In each time slot, the compressed color components 51, 52, 53 are rotated and saved in the temporary buffer and waits till the right time slot to enable 57 the output data 58 to send them to other device.

Since the complexity of the three color components of each pixel varies from pixel to pixel, in some cases, there is possibility of one or two color components have high degree of complexity and one or two of the 3 color components is quite simple. Then, one or two of the reserved temporary buffer can be overflow 61 while one of the 3 color components temporary buffer does not reach the predetermined level 63 to be shifted out as shown in FIG. 6. In this case, due to the potential of overflow of one temporary buffer, the compressed 3 color components will be shifted out to other device with the worst case one temporary buffer having not full length 66 will be filled with dummy codes 67, for example, all "0s" or "1s". The other one or two of temporary buffer will be packed as full register 64, 65 and the packed 3 color components will be shifted out to other device in the same time slot.

FIG. 7 illustrates the case of handling "end of compression" of each group of pixels (for example, a line) cycle. In most cases, there will be at least one color component 71, 72, 73 can not reach fullness of the temporary buffer in the end of the compression cycle. The empty local of the temporary buffer will be filled by dummy codes 74, 75, 76.

FIG. 8 illustrates another case of handling "end of compression" of each group of pixels (for example, a line) cycle. In some cases, there will be at least one color component 81 exceed the predetermined limit of length to shift the compressed data out, and one or two other color components 82, 83 does not reach the fullness level of the temporary buffer in the end of the compression cycle. The empty local of the temporary buffer will be filled by dummy codes 87, and together with the filled color component 84 to shifted out to other device in the end of cycle time. And the next cycle time, only one or two temporary buffer has some compressed data left, other one or two color component buffer might be empty and all empty space will be filled with dummy codes and be shifted out together, When the output buffer data amount reaches a level below a predetermined threshold, the compression ratio will be adjusted to lower to let more data fill the output buffer. While, when the output buffer data amount reaches a level above a predetermined threshold, the compression ratio will be adjusted to higher to data piled in the output buffer to be shifted to other device more quickly.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claimed is:

1. A method of image compression, comprising:
   step 1: within a predetermined time slot, compressing a group of pixels by separately compressing multiple color components of each single pixel;
   separately storing the compressed multiple color components into the corresponding multiple temporary buffer;
   step 2. within another predetermined time slot, compressing the multiple color components of another pixel and storing the compressed color components into the temporary buffer with each compressed color component being saved into different temporary buffer compared to previous time slot;
   repeating the step 2 till the limit of a predetermined time; and
   when all temporary buffer saving the compressed multiple color components reach the predetermined amount of bits, shifting the compressed color components data out to other device.

2. The method of claim 1, wherein under each time slot of compressing the image, the compressed color components are rotated and saved into different temporary buffer.

3. The method of claim 1, wherein the output buffer controller calculates the fullness of the output level and waits until the data amount of compressed color components reach a predetermined level before starts shifting the compressed color components data out into another device.

4. The method of claim 1, wherein a pointer within the output buffer controller calculates the fullness of the output level and instructs the output buffer when to shift out the compressed color components.

5. The method of claim 1, wherein any of the temporary buffer saving the compressed three color components reaches a predetermined limit, all compressed data saving the three color components are shifted out together.

6. The method of claim 5, wherein the empty location within one or two temporary buffer does not reach the predetermined amount of compressed will be filled by predetermined dummy codes.

7. The method of claim 1, wherein the colors components are Red, Green and Blue colors or Luminance, U and V components.

8. The method of claim 1, wherein the end of compression cycle, at least one extended cycle time is enforced to let the empty bits of the temporary buffer be filled with predetermined dummy codes.

9. A method of compressing an mage and controlling the output the compressed image data with a constant data rate, comprising:
   Compressing the predetermined amount of pixels by compressing each segment of pixels in a separate time slot with a constant frequency;
   storing the compressed pixels into the output buffer with a pointer instructing the level of fullness of the output buffer; and
   when the level of fullness reaches the predetermined level, starting output the compressed pixels to another device with a predetermined output data rate and keeping output the compressed pixel data till the end of a group of pixels.

10. The method of claim 9, wherein should the output buffer data amount reaches a level below the predetermined amount, lower compression ratio will be enforced.

11. The method of claim 9, wherein should the output buffer data amount reaches a level above the predetermined amount, higher compression ratio will be enforced.

12. The method of claim 9, wherein a non-stop mechanism is enforced to shift out the compressed color components of a group of pixels to the end of a predetermined time or till the end of a group of pixels are shifted out.

13. The method of claim 9, wherein a pointer is realized to monitor the level of the output buffer and to instruct the compression engine the appropriate compression ratio of the coming image.

14. The method of claim 9, wherein a packing method determines when the piled compressed color components are allowed to shifted out to another device.

15. The method of claim 9, wherein the output buffer saving the rotated compressed color components are comprised of semiconductor SRAM cells.

16. An apparatus of compressing an image, comprising:
   a circuit comprising multiple registers and control logic for temporarily storing the multiple color components of at least one pixel;
   a compression unit which can compress at least two color components of a pixel within a fixed time slot;
   an output buffer comprising multiple registers which stores the compressed color components of each pixel with a control engine deciding which register to save the corresponding compressed color component; and
   an output buffer controller detecting the fullness of each of the output buffer and when all registers reach the predetermined level, then sending the compressed color components saved in the output buffer to another storage device.

17. The apparatus of claim 16, wherein a packing circuit detects the level of the temporary buffer saving the compressed color components and decides when it appropriate time to move the compressed group of pixels into another device.

18. The apparatus of claim 16, wherein a pointer is realized and applied to instruct the compression engine the compression ratio of the next image or a group of pixels and avoid underflow or overflow of the output buffer.

19. The apparatus of claim 16, wherein a controller decides which temporary buffer needs to be filled with the predetermined codes.

20. The apparatus of claim 16, wherein a controller decides when to shift the compressed data of the color components out to another device.

* * * * *